United States Patent
Tundal et al.

(10) Patent No.: US 11,123,792 B2
(45) Date of Patent: Sep. 21, 2021

(54) APPARATUS AND METHOD FOR APPLYING CERAMIC FOAM FILTERS FOR THE REMOVAL OF UNWANTED INCLUSIONS FROM METAL MELTS

(71) Applicant: NORSK HYDRO ASA, Oslo (NO)

(72) Inventors: Ulf Håkon Tundal, Sunndalsøra (NO);
Idar Kjetil Steen, Sunndalsøra (NO);
John Olav Fagerlie, Sunndalsøra (NO);
Terje Haugen, Surnadal (NO)

(73) Assignee: NORSK HYDRO ASA, Oslo (NO)

( * ) Notice: Subject to any disclaimer, the term of this patent is extended or adjusted under 35 U.S.C. 154(b) by 54 days.

(21) Appl. No.: 16/611,648

(22) PCT Filed: May 15, 2018

(86) PCT No.: PCT/EP2018/062453
§ 371 (c)(1),
(2) Date: Nov. 7, 2019

(87) PCT Pub. No.: WO2018/219626
PCT Pub. Date: Dec. 6, 2018

(65) Prior Publication Data
US 2020/0061697 A1   Feb. 27, 2020

(30) Foreign Application Priority Data
May 31, 2017  (NO) .................................. 20170897

(51) Int. Cl.
*B22D 11/119* (2006.01)
*C22B 21/00* (2006.01)
(Continued)

(52) U.S. Cl.
CPC .......... *B22D 11/119* (2013.01); *B22D 43/004* (2013.01); *C22B 9/023* (2013.01); *C22B 21/0084* (2013.01); *C22B 21/066* (2013.01)

(58) Field of Classification Search
CPC ..... B22D 11/119; B22D 43/004; C22B 9/023; C22B 1/0084; C22B 1/066
See application file for complete search history.

(56) References Cited

U.S. PATENT DOCUMENTS

| | | | | |
|---|---|---|---|---|
| 4,158,632 A | * | 6/1979 | Dantzig | .................. C22B 9/023 210/498 |
| 4,872,908 A | * | 10/1989 | Enright | .................. C22B 9/023 266/227 |
| 10,882,101 B2 | * | 1/2021 | Tundal | .................. B22D 11/119 |

FOREIGN PATENT DOCUMENTS

| CN | 203 728 904 | 7/2014 |
|---|---|---|
| NO | 318 003 | 1/2005 |

(Continued)

OTHER PUBLICATIONS

International Search Report dated Jun. 27, 2018 in International (PCT) Application No. PCT/EP2018/062453.

*Primary Examiner* — Scott R Kastler
(74) *Attorney, Agent, or Firm* — Wenderoth, Lind & Ponack, L.L.P.

(57) ABSTRACT

Apparatus and method for filtering molten metal including a container with a removable lid to keep the container sealed during operation, the container having an inlet chamber having an inlet opening receiving metal from a metal supply launder and outlet chamber with outlet opening connected to a launder segment. The container having a partition wall between the inlet chamber and outlet chamber and a ceramic foam filter mounted in the outlet chamber. The inlet chamber and outlet chamber being provided within the container and split by the partition wall. The container being connected in parallel with the metal supply launder via stubs. The launder being provided with a dam or valve device downstream the outlet of the container and another dam or valve device (Continued)

between the said launder stubs. Inside the container there is further arranged a second outlet chamber with a filter.

9 Claims, 5 Drawing Sheets

(51) Int. Cl.
*B22D 43/00* (2006.01)
*C22B 9/02* (2006.01)
*C22B 21/06* (2006.01)

(56) References Cited

FOREIGN PATENT DOCUMENTS

| WO | 2005/080028 | 9/2005 |
| WO | 2016/126165 | 8/2016 |

* cited by examiner

APPARATUS AND METHOD FOR APPLYING CERAMIC FOAM FILTERS FOR THE REMOVAL OF UNWANTED INCLUSIONS FROM METAL MELTS

The present invention concerns an apparatus and a method for applying ceramic foam filters for the removal of unwanted inclusions from metal melts by filtration.

It is generally known to remove small inclusions from molten metal such as molten aluminium by filtration. A typical material used for such filters is porous ceramic, commonly referred to as CFF (Ceramic Foam Filters). These CF (Ceramic Foam) filters are not easily wetted by the molten metal and since such materials have relatively fine pores, considerable difficulties are encountered in initiating the flow of metal through the filter (priming the filter). It is therefore generally known to use deep filter boxes to generate sufficient metal head by gravitation to force the metal through the filter.

WO2016/126165A1 (of the present applicant), describes an apparatus and a method that operates in a different way than CFF boxes as mentioned above. By lifting the metal with the use of underpressure in the filter box it is possible to avoid drainage of metal after the cast has been finished. In addition, the new CF filter concept provides a different and a very good priming of the filter, as the metal flow through the filter during priming is in the opposite direction as that during ordinary operation.

The present invention is based on the same principles for priming the filter as WO2016/126165A1 filter box but relates to further improvements by making the CFF box flexible. It is built as a double CFF box but it can also be operated as a single CFF box (or built as a triple box and also operated as a double box)

Figure 1:
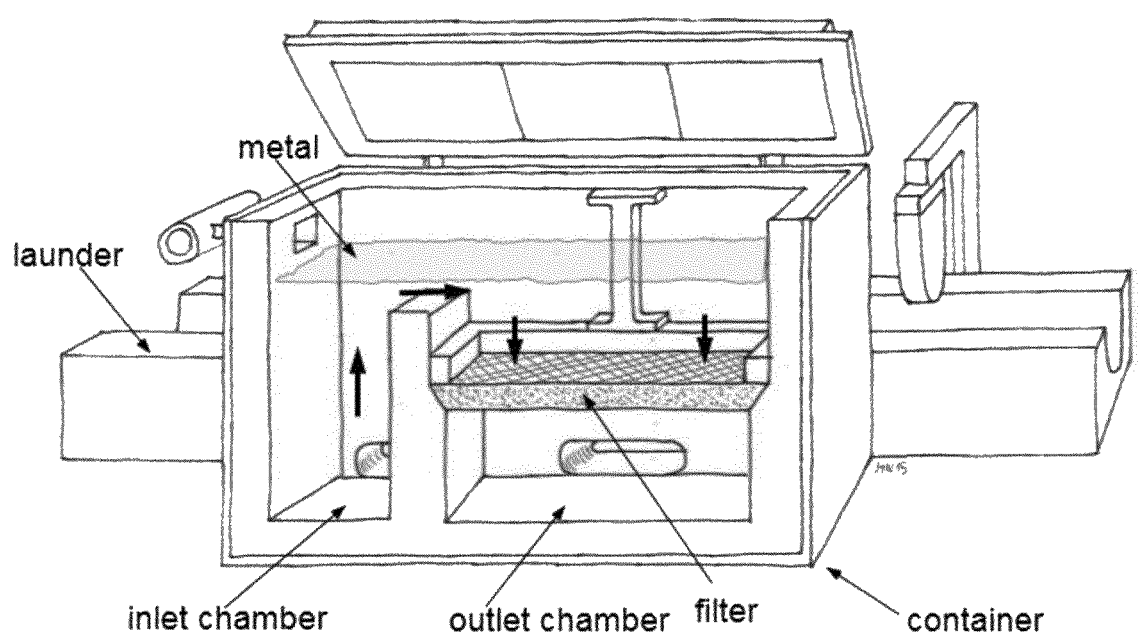
Figure 2:
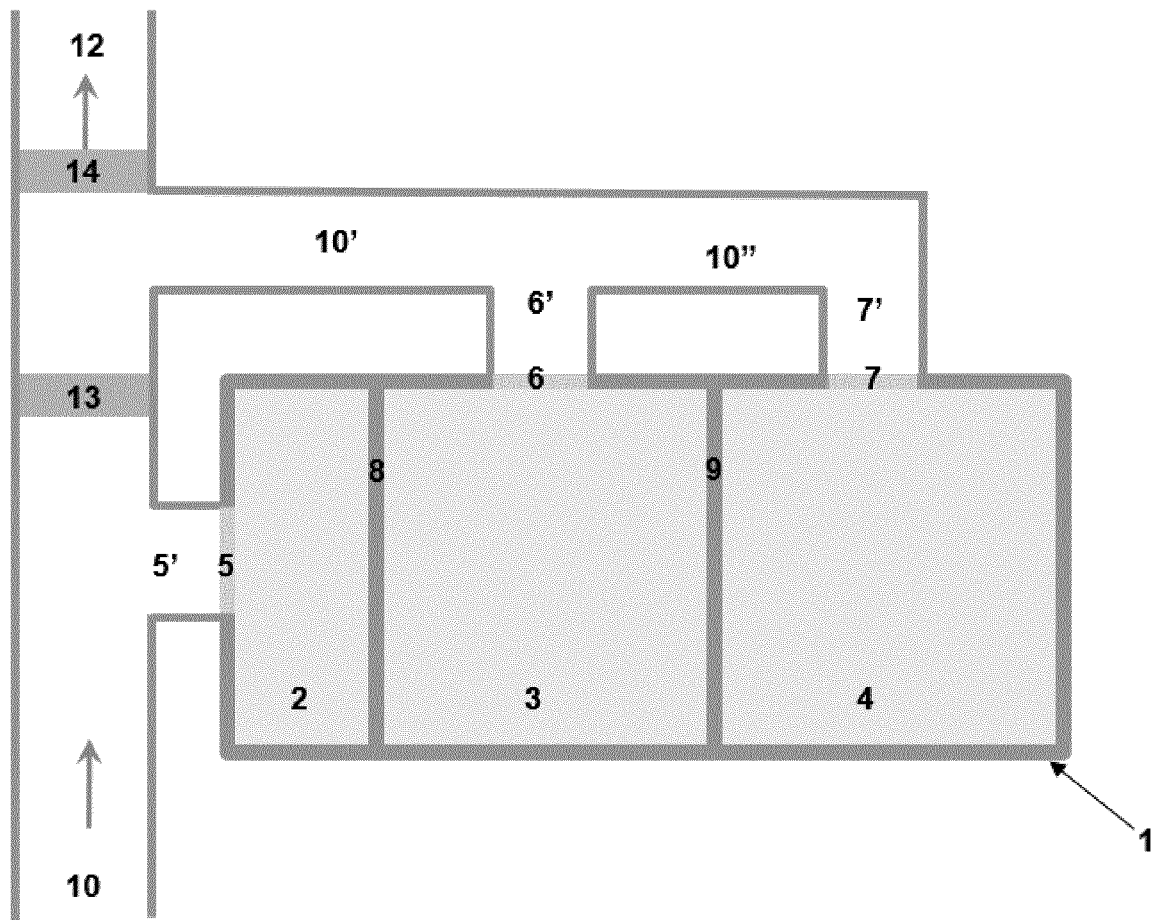
Figure 3:
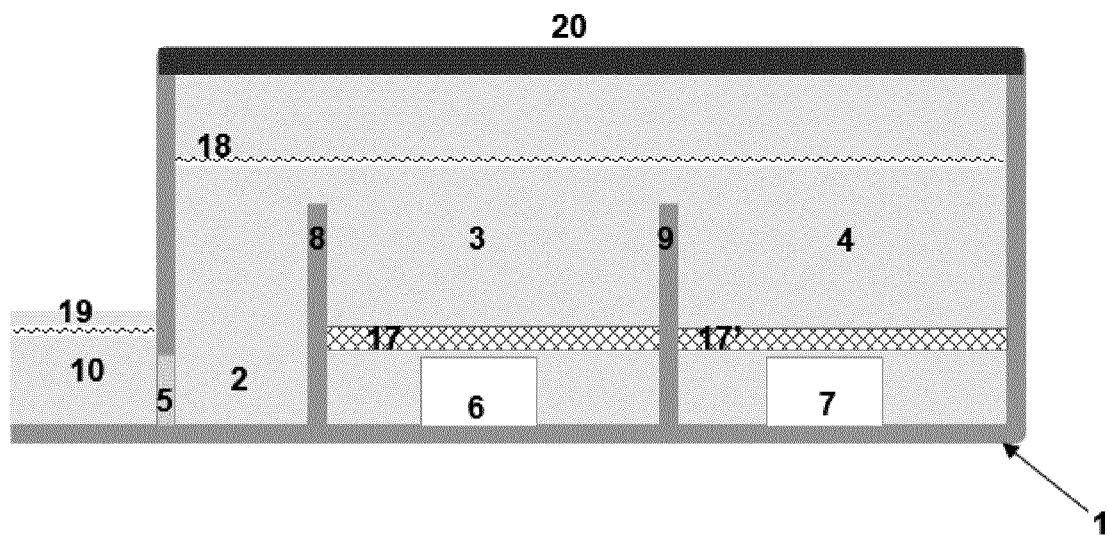
Figure 4:
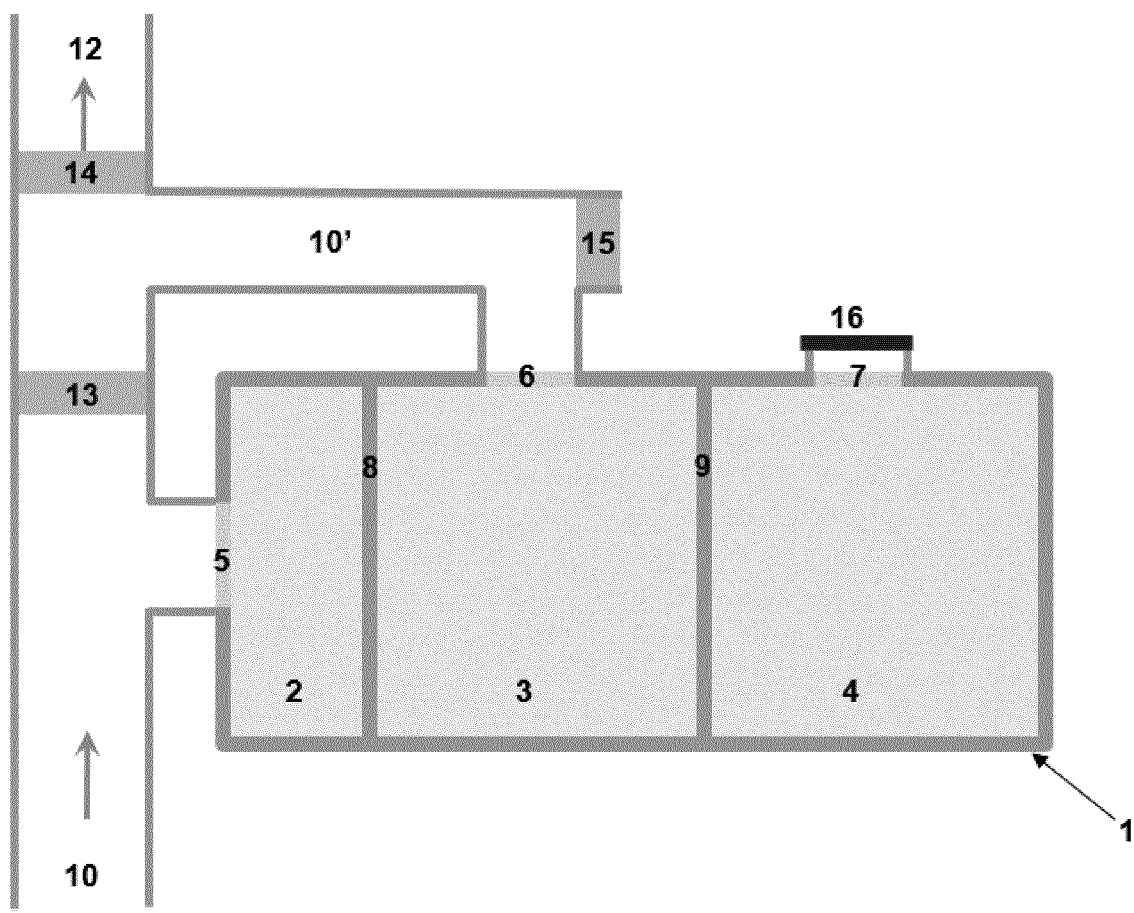
Figure 5:
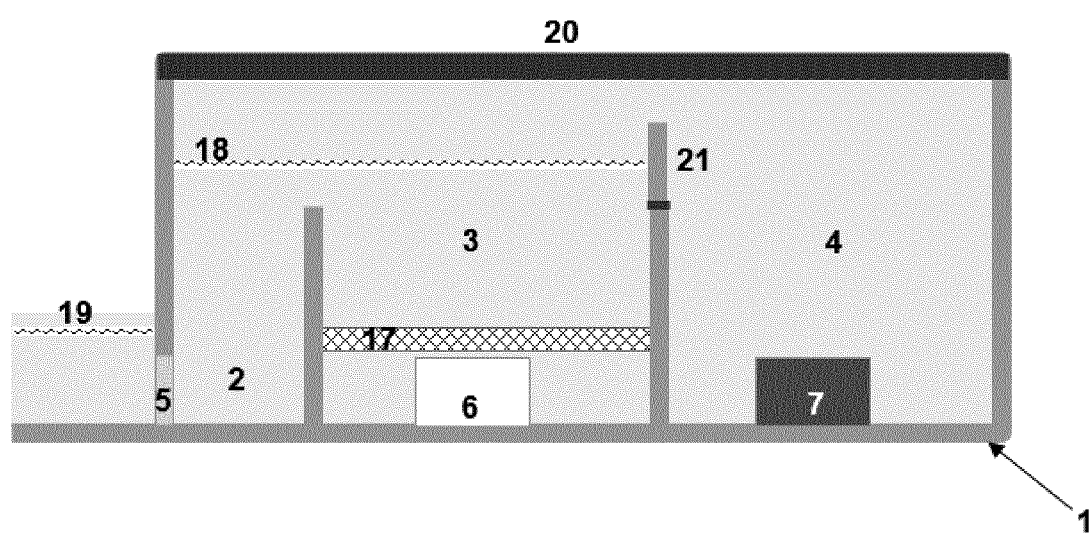

The invention will be further described in the following with reference to the drawings where:

FIG. 1 shows in perspective view a cross section of a CF filter device or apparatus according to the invention described in WO2016/126165A1, FIG. 2 shows a top view of a double CF filter apparatus, with one inlet chamber 2 and two outlet cambers 3, 4 connected to a launder system for the supply of metal to and from the filter apparatus, FIG. 3 shows a cross-sectional view of the double CF filter apparatus shown in FIG. 2 with the metal level 19 in the launder outside the box and the metal level 18 inside the box indicated, FIG. 4. shows a top view of a the same double CF filter apparatus as in FIG. 2, but with the launder segment from outlet chamber 4 removed and the outlet opening 7 closed off with an air tight sealing 16. The open launder segment is sealed with a dam 15, FIG. 5 shows a cross-sectional view of the double CF filter apparatus as shown in FIG. 4 with the outlet opening 7 closed off and the height of the partition wall between the outlet chambers increased with a removable segment of a refractory material 21.

FIG. 1 shows the prior art CF filter apparatus according to the WO2016/126165A1 and includes a container or box construction with an outer shell or casing of metal and an inner thermally insulated interior cladding or wall construction made of heat resistant insulation and refractory material. A removable lid is provided on the top of the container to keep the container sealed (air tight) during operation. The container has an inlet opening receiving metal from a metal supply launder, and an outlet chamber with an outlet opening where the CF filter is mounted the outlet chamber.

The inlet chamber and outlet chamber are provided side by side within the container, being split by a partition wall extending from the bottom of the container and upwardly, to a preset level of the container interior height. The container is connected in parallel with a metal supply launder via transversal metal launder stubs respectively provided between the inlet and outlet openings of the container and the metal supply launder. To control the metal flow in the metal supply launder, two dams are provided in the launder, one dam after the outlet of the container and the other dam in the launder between the inlet and outlet openings.

This apparatus is operated in the following way: When metal is released from the furnace, the dam downstream the container is closed whereas the dam between the inlet and outlet openings is open. As soon as the metal level in the launder is above the inlet and the outlet openings, an ejector starts to evacuate the air inside the container lifting the metal upwards in the inlet and outlet chambers. The metal will stop against the bottom of the filter in the outlet chamber because there is a resistance for the metal to enter into a filter with small pores. In the inlet chamber the metal level will continue to rise as the under-pressure increases. When the height difference between the bottom of the filter and the metal inside the inlet chamber has reached a certain level, the pressure on the bottom of the filter will be high enough to prime the filter. The maximum pressure for priming that can be obtained with this solution will be the height difference between the bottom of the filter and the top of the partition wall. To prevent that the filter floats up when the pressure against the bottom of the filter increases, there is a clamping device mounted to hold down the filter. When the priming operation is finished the under-pressure is reduced and correspondingly the metal level inside the box is increased to above the partition wall as indicated in the Figure. At this point the dam between the inlet and the outlet openings will be closed and the dam downstream the container will be opened. Then the metal is forced to go through the inlet opening, above the partition wall, through the filter and out through the outlet opening. When the cast is close to being finished the metal level inside the container is gradually lowered by reducing the under-pressure and the metal eventually released into the launders.

FIG. 2 shows a top view of a CF filter apparatus according to the present invention, with one inlet chamber 2 and an inlet opening 5 connected to the main launder 10 coming from the furnace, two outlet chambers 3, 4 and two outlet openings 6, 7 connected to launder 10 via launder segments 10', 10". The three different chambers are separated by two partition walls 8, 9. Two dams 13, 14 are controlling the metal flow in the start-up phase and in the operating phase. The launder 12 leads the metal from the container or filter box 1 towards the casting pit.

FIG. 3 shows a cross-sectional view of the same filter apparatus as shown in FIG. 2. A filter 17, 17' is mounted in each of the outlet chambers 3, 4. The metal levels outside the inlet opening 5 and inside the box 1 during operation are indicated by 19 and 18 respectively. This apparatus is operated similar to the single CFF box shown in FIG. 1: When the first metal is released from the furnace the dam 14 is closed whereas the dam 13 between the inlet 5 and outlet openings 6, 7 is open. As soon as the metal level is above the inlet and the outlet openings 5, 6 and 7, an ejector (not shown) starts to evacuate the air inside the box 1 lifting the metal in the inlet 2 and outlet 3, 4 chambers. The metal will stop against the bottom of the filters 17, 17' in the outlet chambers because there is a resistance for the metal to enter into a filter with small pores. In the inlet chamber 2 the metal will continue to rise as the under-pressure increases. When the height difference between the bottom of the filters 17, 17' and the metal inside the inlet chamber 2 has reached a certain level, the pressure on the bottom of the filters will be high enough to prime the filters, i.e. metal starts to penetrate into the filters. If one filter primes before the other filter, the metal level in the chamber where the priming has completed will rise to the same level as the metal level in the inlet chamber. Upon further reduction in the under-pressure the second filter will also prime.

When the priming operation is finished the metal level 18 inside the box is increased to above the partition walls 8, 9 as indicated in FIG. 3. At this point the dam 13 between the inlet and the outlet openings is closed and the dam 14 is opened. Then the metal is forced to go through the inlet opening 5, above the partition walls 8, 9, through the filters 17, 17' and out through the outlet openings 6, 7. When the cast is close to being finished the metal level inside the box is gradually lowered by reducing the underpressure and the metal eventually released into the launder 10.

FIG. 4 shows a top view of a the same double CF filter apparatus as in FIGS. 2 and 3, but with the launder segment 10" from outlet chamber 4 taken away and the outlet 7 closed off with an air tight sealing 16. The open launder segment 10' is sealed with a dam 15.

FIG. 5 shows a side view of the same apparatus as shown in FIG. 4 with the outlet opening 7 closed off and the height of the partition wall between the outlet chambers increased with a removable segment 21 that is made of a refractory material. By these modifications the double filter box can be operated as a single filter box.

For production of standard products, coarse filters (30-50 ppi) are normally sufficient to produce the required metal quality. For critical products, finer filters (60-80 ppi) may be needed in order to be capable of producing metal with a sufficient cleanliness. It is known that coarser filters can allow rather high flow rates through the filter whereas fine filters may clog if the filter area becomes too small for a certain flow rate. The present invention provides a possibility of operating the double filter box as a single filter box wherein, one relatively coarse filter is used for standard products. For critical products when there is a need for using finer filters the filter box should be operated as a double filterbox to provide enough filter area to avoid clogging or a too large metal height difference before and after the filter box.

The cost benefits of this flexibility can be illustrated by an example. Assume a casthouse that produces 2000 cast per year and that only 10% are high quality products that require very fine CF filters. In this case 1800 casts can be made operating the double CFF box in a single mode. This means that the cost for 1800 CF filters can be saved. In addition, the cost for processing (used filters are processed by the dross processing plants to get the metal that is left inside the filters after the end of the cast out again) the 1800 used filters will be saved as well as the work and the extra energy needed for operating the filter box in a double mode. The total cost savings probably adds up to about 100.000 Euros per year.

The work of changing from a double to a single mode operation should not take too much time, probably less than 30 minutes. However, in order to avoid too many changes back and forth the high quality products should be produced in campaigns.

The layout of the flexible CFF apparatus shown in the figures is one option. There are other possible layouts that could work equally well.

The invention claimed is:
1. An apparatus for filtering molten metal comprising
a container (1) with an outer shell or casing of metal and an inner thermally insulated interior cladding or wall construction made of heat resistant insulation and refractory material, and
a removable lid (20) provided on top of the container to keep the container sealed during operation,
wherein the container (1) has
an inlet chamber (2) having an inlet opening (5) receiving metal from a metal supply launder (10),
an outlet chamber (3) with an outlet opening (6) connected to a launder segment (10'), and
a partition wall (8) between the inlet chamber (2) and the outlet chamber (3),
wherein a ceramic foam filter (17) is mounted in the outlet chamber (3),
wherein the inlet chamber (2) and the outlet chamber (3) are provided side by side within the container (1) and are split by the partition wall (8) extending from the bottom of the container (1) upwardly to a preset interior height level of the container (1), whereby the container (1) is connected in parallel with the metal supply launder (10) via stubs (5', 6') that communicate with the inlet opening (5) and the outlet opening (6) respectively,
wherein the metal supply launder (10) has a dam (14) or valve device downstream the outlet opening (6) of the container (1) and another dam or valve device (13) between the stubs (5' and 6'), and
wherein the container (1) has a second outlet chamber (4) with a filter (17') that, when in use, communicates with the first outlet chamber (3) via a space above a partition wall (9) extending from the bottom of the container and upwardly to a preset interior height level of the container (1), where the second outlet chamber (4) has one outlet (7) provided by a stub (7') connected to a launder segment (10") being in connection with metal supply launder (10).

2. The apparatus according to claim 1,
wherein
the second outlet chamber (4), when not in use, is separable from the first outlet chamber (3) by a segment (21) that is arranged at the top of the partition wall (9) to avoid metal flows into the second outlet chamber (4) and the outlet (7) of the second outlet chamber (4) is closable by an air tight sealing (16).

3. The apparatus according to claim 2,
wherein
the launder segment (10") is removable and the launder segment (10') is sealable by a dam (15).

4. The apparatus according to claim 2,
wherein
the filter (17') is removable from the second outlet chamber (4).

5. The apparatus according to claim 1,
wherein
the ceramic foam filter (17) and the filter (17') each have a grade such that the inlet chamber (2), the outlet chamber (3), and the second outlet chamber (4) are capable of operating at 60-80 ppi.

6. The apparatus according to claim 1,
wherein
the ceramic foam filter (17) has a grade such that the first chamber is capable of operating at 30-50 ppi.

7. A method for filtering molten metal comprising
providing a container (1) with an outer shell or casing of metal and an inner thermally insulated interior cladding or wall construction made of heat resistant insulation and refractory material, and a removable lid (20) provided on top of the container to keep the container sealed during operation, wherein the container (1) has
- an inlet chamber (2) having an inlet opening (5) receiving metal from a metal supply launder (10),
- an outlet chamber (3) with an outlet opening (6) connected to a launder segment (10'), and
- a partition wall (8) between the inlet chamber (2) and the outlet chamber (3), wherein a ceramic foam filter (17) is mounted in the outlet chamber (3), wherein the inlet chamber (2) and the outlet chamber (3) are provided side by side within the container (1) and are split by the partition wall (8) extending from the bottom of the container (1) upwardly to a preset interior height level of the container (1), whereby the container (1) is connected in parallel with the metal supply launder (10) via stubs (5', 6') that communicate with the inlet opening (5) and the outlet opening (6) respectively, wherein the metal supply launder (10) has a dam (14) or valve device downstream the outlet opening (6) of the container (1) and another dam (13) or valve device between the stubs (5' and 6'), and wherein the container (1) has a second outlet chamber (4) with a filter (17') that is used for increasing the filter capacity when producing metal with a high cleanliness where the second outlet chamber (4) communicates with the first outlet chamber (3) via a space above a partition wall (9) extending from the bottom of the container and upwardly to a preset interior height level of the container (1), where the second outlet chamber (4) has one outlet (7) provided by a stub (7') connected to a launder segment (10") being in connection with metal supply launder (10).

8. The method according to claim 7, wherein the ceramic foam filter (17) and the filter (17') are each primed as follows:
- as the first metal is released from the furnace, the dam (14) is closed, whereas the another dam (13) between the inlet (5) and outlet openings (6, 7) is open,
- as soon as the metal level is above the inlet opening (5), the outlet opening (6), and the outlet (7), air inside the container (1) is evacuated whereby the metal in the inlet chamber (2), the outlet chamber (3), and the second outlet chamber (4) is lifted,
- the metal stops against the bottom of the ceramic foam filter (17) and the filter (17') in the outlet chamber (3) and the second outlet chamber (4) because there is a resistance for the metal to enter into the outlet chamber (3) and the second outlet chamber (4) each having small pores,
- in the inlet chamber (2), the metal will continue to rise as the under-pressure increases,
- as the height difference between the bottom of the ceramic foam filter (17) and the filter (17') and the metal inside the inlet chamber (2) has reached a certain level, the pressure on the bottom of the ceramic foam filter (17) and the filter (17') will be high enough to prime the filters.

9. The method according to claim 7, wherein the ceramic foam filter (17) and the filter (17') each have a grade such that the inlet chamber (2), the outlet chamber (3), and the second outlet chamber (4) are capable of operating at 60-80 ppi.

* * * * *